United States Patent Office 2,816,768
Patented Dec. 17, 1957

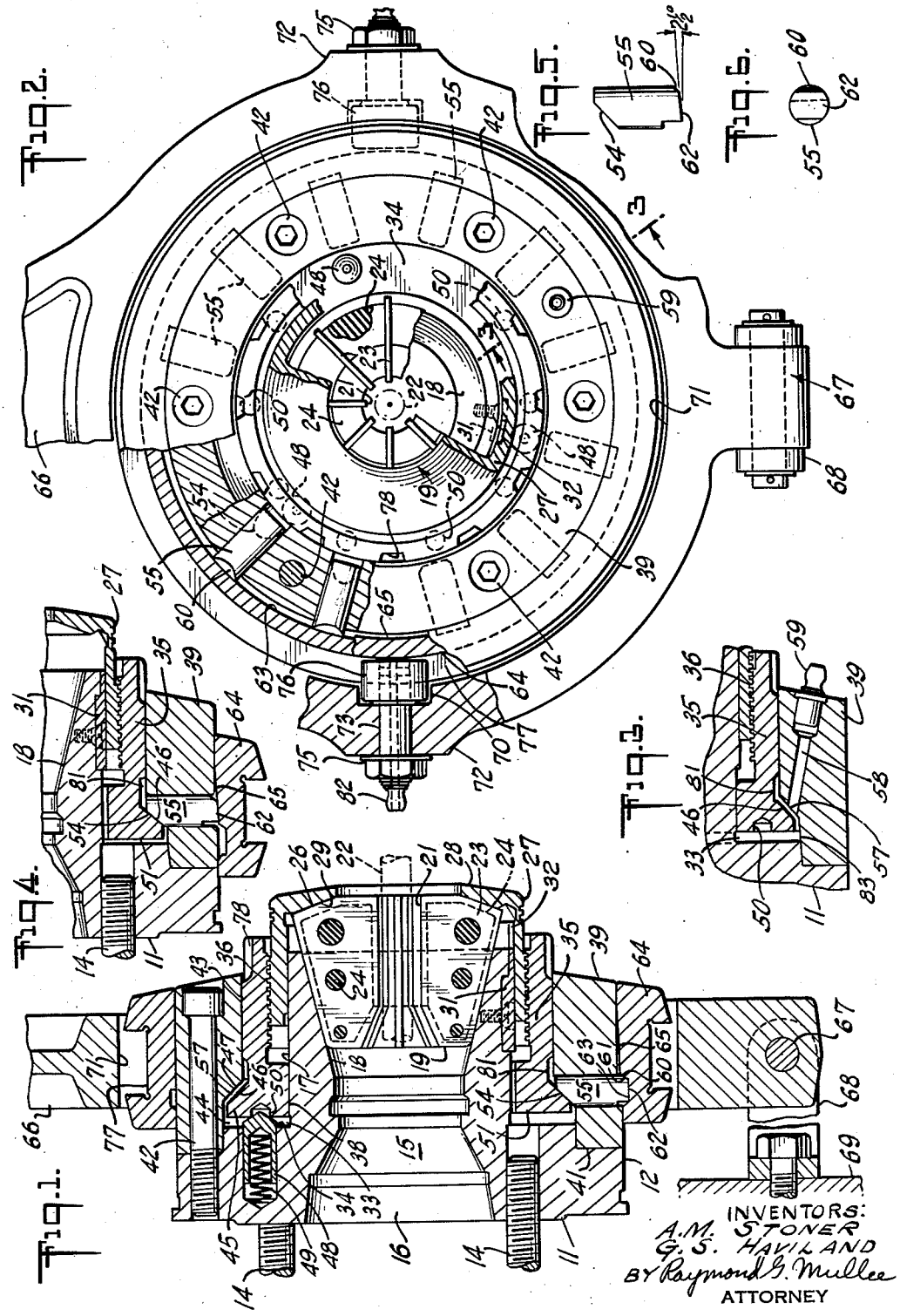

2,816,768

LEVER OPERATED COLLET CHUCK

Arthur Merrick Stoner, Madison, and Girard S. Haviland, Wethersfield, Conn., assignors to The Jacobs Manufacturing Company, West Hartford, Conn., a corporation of New Jersey Application September 11, 1956, Serial No. 609,194

15 Claims. (Cl. 279—50)

This invention relates to a lever operated collet chuck adapted particularly for attachment to a lathe spindle nose. It is of a type wherein a collet contained in the chuck is caused upon actuation of a lever to grip a piece of cylindrical stock.

A general object of this invention is to provide an improved and novel collet chuck of the lever operated type which is efficient in operation so as to operate with a minimum of effort, which is practical in structure so as to enable ready assembly and disassembly thereof for repairs or cleaning, and which has a minimum of parts.

A further object of the invention is to provide a collet chuck of the lever operated type having certain adjustable elements whereby the movement required of the lever to grip the collet with the stock may be closely controlled and reduced to a minimum.

Another object of the invention is to provide a lever operated type collet chuck having certain adjustable elements and related structures whereby a single collet may be employed with stock of various diameters.

A further object of the invention is to provide certain improvements in the lever operating mechanism of a lever operated collet chuck whereby the efficiency of the device is increased.

A still further object of the invention is to provide practical means for lubricating various movable parts of the chuck so as to improve the efficiency of the device and to reduce wear to a minimum.

The invention further lies in the particular structure of the components of the device as well as in their general arrangement and cooperative association with one another to provide the advantages intended herein.

The foregoing and other objects and advantages of the invention will appear more fully hereinafter from a consideration of the detailed description which follows when taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a longitudinal section through the chuck with the collet therein;

Fig. 2 is a right end view of Fig. 1, with parts in section;

Fig. 3 is a detail section on the line 3—3 of Fig. 2;

Fig. 4 is a fragmentary detail of the device in shifted position;

Fig. 5 is an enlarged detail view of a cam pin; and

Fig. 6 is a plan view of the head end of a cam pin.

In describing the invention in further detail, reference is now directed to the several drawings and particularly to Fig. 1. In the drawings is shown a main block or body member 11 the left end of which is radially enlarged to provide a thick, annular flange 12. The latter serves as a means whereby the device is mountable, as by bolts 14, to a suitable support; such as the rotatable headstock or spindle nose of an associated lathe machine, not shown.

An axial bore 15 which extends through the main body is relatively enlarged at its left end 16 to accommodate a projection, such as the center piece of the associated lathe's spindle. The right portion of the main body member is relatively reduced and forms an elongated smooth surfaced cylindrical extension 17. The axial bore 15 enlarges conically as it extends through section 17 to the outside to form a coned opening 18 having a smooth wall surface. This opening or recess 18 accommodates a separate collet member 19 having a conical surface of complementary taper.

The collet has an axial through hole 21 to accommodate cylindrical stock 22, shown in broken line. Hole 21 is formed by the surrounding inner jaw faces of a plurality of equally spaced radially extending hard metal jaw plates 23. These are bonded to one another by flexible material, such as rubber 24 disposed between them. The jaw plates extend in all directions slightly beyond the rubber bonding material. The collet is truncated at its narrower end, and it has a beveled edge 26 at its opposite end.

The structure of the collet permits progressive contraction of its center bore 21, whereby the collet is enabled to accommodate a range of stock having various diameters. The collet is adapted to be received partway into the coned recess 18 of the main body member without contraction of its normal diameter. When the collet is wedged further into the recess, the jaw plates will be forced radially inward and thus contract the diameter of the center bore. Wedging is continued until the jaw plates securely grip a piece of stock of given diameter previously inserted into the bore of the collet.

The structure of the present invention provides means for initially wedging or adjusting the collet into the conical recess 18 of the main block 11 until the collet bore has contracted to a diameter a little greater than that of the particular stock 22 received therein. Means is also provided in the present invention which retains the collet in its adjusted position so that it will not slip therefrom. Other means is provided whereby a slight shift of a manual lever in one direction will effect a slight further wedging of the collet in its recess from its adjusted position and consequent gripping of the stock; and whereby a return of the lever to normal position will relax the grip of the collet from the stock.

The means for initially wedging and adjusting the position of the collet in the recess 18 so as to attain a desired contracted diameter of the bore of the collet, short of a gripping condition on the stock, includes a sleeve or slide member 27 which slidably sleeves over the right end of the cylindrical extension 17. Member 27 has an inturned annular end flange 28 which overhangs the marginal portion of the mouth end of the conical recess 18. A conical taper 29 on the inner face of flange 28 is intended to abut against the complementary bevel 26 of the collet. Slide member 27 is restrained against rotation and is guided for longitudinal slidable movement on extension 17 by a key 31. The latter is fixed partly in the surface of extension 17; and a projecting portion thereof engages in a complementary groove or trackway 32 formed longitudinally of the inner face of slide member 27. The latter is relatively shorter than extension 17 so that, when moved to its limit on extension 17, a space 33 remains between it and an inner wall 34 of the mounting flange 12.

Slide member 27 is actuated by a surrounding cam member 35. The latter has an elongated cylindrical body having a threaded internal section 36 (Figs. 1, 3) engaging a complementary threaded external surface of the slide member. The left internal end of cam member 35 is of reduced diameter, and provides a short internal surface 38 which is movable in space 33 on the surface of extension 17. Cam member 35 is adapted for slidable as well as rotatable action on extension 17. It is guided in these movements by a surrounding guide block 39. The latter is a horizontally disposed hollow cylindrical member having a left end wall 41 which abuts the inner marginal portion of body flange 12 and is bolted fast thereto by a ring of bolts 42. The guide block has an internally reduced central portion 43 which bears upon the body surface of cam member 35. To the left of this reduced portion 43, the block is internally enlarged and provides an annular recess 44. The inner face 34 of flange 12 forms the left wall of this recess. A peripheral extension 45 about the left end of the cam member extends freely into recess 44. The right face of extension 45 forms a sloping annular cam surface 46 which opposes a complementary sloping annular wall surface 47 of the recess.

A plurality of detent pins 48, which may be arranged 120° apart and axially slidable in complementary holes in the inner wall 34 of flange 12, are loaded by springs 49 toward the opposed end wall 51 of the cam member 35. Normally, the rounded end of one of the pins engages in one of a series of shallow detent holes 50 formed in the end wall 51 and arranged 36° apart. Under the load of springs 49 the cam surface 46 bears against complementary cam faces 54 of an annular series of equally spaced cam pins 55, approximately 30° apart. The latter have cylindrical bodies which slide in complementary holes formed radially through the guide block. The cam pin holes open through the annular sloping wall 47 of the recess. The cam faces 54 of the cam pins abut the camming surface 46 of the cam member and space it, as indicated by the clearance 57, a slight distance from the opposed wall slope 47. This clearance is in communication with a lubricant bore 58 (Fig. 3) which leads through the guide block to a lubricant fitting 59. The spring load 49 of the several detent pins, acting through the cam member 35 on the cam pins, forces the latter radially outward to a normal position as in Fig. 1. In this normal position the heads 62 of the cam pins project through the guide block and seat in an annular channel 63 formed in the opposed face of a surrounding shift ring member 64. This channel has a steep shoulder 61 along its right side, having a slope angle, here of 30°. Against slope 61 complementary beveled corners 60 of the cam pins seat. A conical inner surface 65 of the shift ring enlarges slightly down to the rim of slope 61, said surface being inclined about 2½°. The shift ring is slidable longitudinally on the guide block.

A hand powered lever 66 is used to effect a shift or sliding movement of the ring member. This lever is pivoted at its bottom end 67 in the fork of a bracket 68 fixed to a support 69 which may be the base of the associated lathe machine. The lever provides a circular opening 71 which freely surrounds the ring member. At diametrically opposite points the lever has a pair of bosses 72. Fitted in each boss is a horizontally disposed roller supporting pin 73, retained therein by nut and washer means 75. Carried on the inner end of the pin is a roller 76, part of which is closely accommodated in a recess 70 of the boss, and part of which projects closely into an annular channel track 77 of ring member 64.

In the use of the device, a spanner wrench (not shown) is engaged in complementary peripheral notches 78 formed in a projecting end of cam member 35. Sufficient torque is applied to the wrench in a clockwise direction (Fig. 2) so as to overpower the spring loaded detents 48 and rotate the cam member. This causes the slide member 27 to travel outwardly. Rotation is continued until the slide member is free of cam member 35. The collet 19 is then inserted in the coned recess 18 and the slide member is replaced by rotating the cam member in the reverse direction, thus sliding member 27 inwardly until the flange 28 of the latter abuts the collet. Subsequent rotation of the cam member wedges the collet into the coned recess and progressively contracts the diameter of the collet bore. As the cam member is rotated, the rounded ends of the three spring loaded detent pins 48 are caused successively to slip in and out of the ten associated holes 50, this action recurring after each twelve degrees of rotation of cam member 35. The cam member is rotated until the diameter of the bore of the collet is reduced to a size (Figs. 1, 2) which is a little greater than the diameter of the piece of stock 22 inserted therein. Cam member 35 is then turned a few degrees, if necessary, until it offers substantial resistance to rotation. In this adjusted condition, one of the detent pins 49 will have registered with and engaged in one of the detent holes 50. The detent will hold the cam member locked so that it will not slip or creep in a rotary direction under vibration of the associated lathe machine.

After the desired adjustment of the collet has been made, the hand lever 66 is pivoted to the left (Fig. 1). This causes the rollers 76 to ride in the channel 77 and effect a slide or shift movement of ring member 64 over the heads 62 of the several cam pins. In this shifting of the ring member, the inner wedge surfaces 61 and 65 are successively moved over the heads of the pins, whereby the latter are forced radially inward against the cam member 35, causing the cam member to move to the left in the space 33, as appears in Fig. 4. Initial movement of the cam pins is rapid as the steep slope 61 of the inner surface of the ring member is moved over the beveled corners 60; subsequent movement of the pins is slower but under greater pressure as the surface 65 is moved over the heads 62 of the cam pins. The cam pins move radially inward until their action has caused the collet 19 to lock firmly on the work piece 22. Surface 65 is of uniform slope and sufficient length to enable the chuck to grip with equal force work pieces varying slightly in diameter, without resetting the cam member 35.

The surfaces of the heads 62 of the cam pins have a slight angle of decline, shown in Fig. 5 as 2½ degrees, which is complemented by the conical surface 65 of the ring member. Accordingly, the inner surface 65 of the ring member cooperates with the surfaces 62 of the heads of the pins at an angle which is slightly less than the angle of friction. Now, after the cam pins 55 have moved inward into tight gripping engagement, slight additional movement of the surface 65 over the complementary surface 62 of the heads of the pins wedges the pins in a locked condition which is irreversible as long as the ring member is not shifted manually. The grip of the collet upon the piece of stock 22 is accordingly locked and cannot slip free of the latter.

To release the grip of the collet jaws from the stock 22, the hand lever is shifted back to normal position, whereupon the load of the detent springs 49 acts upon the released cam member 35, sliding it to the right. As a consequence, the cam pins restore.

If it is desired to insert into the collet a piece of stock having a smaller diameter than the previously inserted piece, the cam member 35 is further adjusted so as to draw the collet further into its recess and thereby further contract the diameter of the collet. The cam member is then locked as before by one of the detents 48 at a point where the contracted inner diameter of the collet is slightly greater than that of the stock. The lever 66 is then shifted as before so as to draw the collet into tight gripping engagement with the stock.

To facilitate riding of the roller elements 76 in the channel of the ring member, the roller pins 73 are hollow through and carry at their outer ends lubricant fittings 82 whereby a lubricant such as grease can be passed through the pins to the roller and to the channel in which they ride.

To maintain the cam pins 55 and associated cam member 35 as well as the detent pins 48 lubricated, lubricant from the fitting 59 (Fig. 3) passes through the bore 58 to the clearance 57, from where it flows to the annular well 81 at the base of the cam surface 46. It also passes through a slight clearance 83 about the cam flange to the space 33 and the associated detents 48.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is the intent, therefore, to claim the invention not only as shown and described but also in all such forms and modifications thereof as may reasonably be construed to fall within the spirit of the invention and the scope of the appended claims.

What is claimed is:

1. In a collet chuck of the character described, including a body member mountable at one end to a support and having in its opposite end a coned recess adapted to receive partway therein a separate contractable conical collet member; a slide member limited to longitudinal sliding movement on the body member and having an annular flange overhanging the mouth of the coned recess and the marginal edge of a collet received in the recess; a cam member having rotatable and a limited longitudinal slidable movement on the body member and having a threaded part in engagement with a complementary threaded surface of the slide member whereby rotation of the cam member in one direction causes the slide member to travel inwardly to abut its flange against the collet member so as to force the latter further into the conical recess, and whereby rotation in the opposite direction draws the flange of the slide member away from the collet; and cam means cooperable with complementary means on the cam member to slide the latter longitudinally a limited distance so as to further abut the slide member against the collet and to further force the latter into the coned recess.

2. In a collet chuck as defined in claim 1, wherein the cam member is spring loaded into a normal position limited by the cam means, in which condition an overload torque is required to rotate it against the spring load to effect longitudinal sliding movement of the slide member.

3. In a collet chuck as defined in claim 1, wherein a series of spring loaded detents are slidable out of a wall of the body member that is opposite and end wall of the cam member and are successively forced in and out of a series of shallow detent holes formed in the end wall of the cam member as the latter is rotated, whereby the rotated position of the cam member is yieldingly locked in any one of a plurality of closely spaced positions of the cam member.

4. In a collet chuck as defined in claim 1, wherein the cam member is loaded by springs to a normal position limited by the cam means, in which condition an overload torque is required to rotate the cam member against the spring load to effect longitudinal sliding movement of the slide member inwardly.

5. In a collet chuck as defined in claim 4, wherein a guide block surrounds the cam member and has an annular series of radially disposed holes, and the cam means includes a plurality of pins disposed in the holes and having cam faces normally abutting a complementary cam face of the cam member whereby the cam member is limited against longitudinal movement in an outward direction from its normal position.

6. In a collet chuck as defined in claim 5, wherein a shiftable wedging ring is longitudinally slidable on the guide block and provides an annular inner channel in which the head ends of the cam pins seat, the spring loaded cam member normally acting on the cam pins to force them in a radial direction to seat in the shiftable wedging ring; and wherein the wedging ring is shiftable to cam the cam pins radially inward to effect a camming action upon the cam member so as to slide it longitudinally in an inward direction against the load of the springs.

7. In a collet chuck as defined in claim 5, wherein the cam pins project into an annular space surrounding the cam member and this space communicates with a passage connected to a lubricant fitting.

8. In the combination of a separate contractible conical collet with a body member adapted to be supported at one end to a spindle head and having a coned recess opening out of its opposite end in which the collet is partly received without being contracted; a slide member limited to longitudinal sliding movement on the body member and having an annular flange overhanging the mouth of the recess and the marginal edge of a projecting end of the collet, a cam member arranged for rotatable and limited longitudinal slidable movement on the body member, the cam member having a threaded internal portion in engagement with a complementary threaded external surface of the slide member whereby rotation of the cam member in one direction causes the slide member to travel inwardly on the cam member to abut its flange against the collet member and force the latter further into the coned recess, and whereby rotation of the cam member in the opposite draws the slide member outwardly on the cam member and the flange away from the collet, spring loaded means mounted in the body member constantly urging the cam member slidably in an outward direction, cam means normally limiting movement of the cam member in this outward direction and operable to cam the cam member slidably in an inward direction against the load of the spring means, whereby after the flange of the slide member has been brought into abutment with the collet member by rotation of the cam member, actuation of the cam means serves to draw the flange of the slide member further inward to press the collet member a corresponding distance into the coned recess.

9. In the combination as defined in claim 8, wherein the cam means includes a plurality of radially disposed cam pins normally limiting against a complementary cam surface of the cam member, and means for pressing the pins radially inward to actuate the cam member in an inward direction.

10. In the combination as defined in claim 8, wherein the spring loaded means comprises an annular series of pins slidable in the main body and loaded by springs into engagement with an opposed end wall of the cam member.

11. In the combination as defined in claim 8, wherein the cam means includes a plurality of radially disposed cam pins supported in the body member, having cam faces normally limiting against an annular cam surface of the cam member and having their head ends projecting from the body member, and including shiftable means engaging the head ends of the cam pins and having a conical surface slidable over a complementary surface of the heads to force the cam pins radially inward to effect a camming action against the cam member.

12. In the combination as defined in claim 11, wherein the shiftable means comprises a ring member slidable on the body member so as to bring its conical surface over the pin heads; a lever pivoted at one end, having an opening surrounding the ring member and including a pair of opposed roller elements engaged in a peripheral channel of the ring member, whereby pivoting of the lever causes the roller elements to ride in the channel and to effect a slide movement of the ring member.

13. In the combination comprising a chuck having a coned body member for reception of a collet therein, a sleeve member about the coned body and including an inturned flange for camming the collet into the coned body member, and shiftable means for actuating the sleeve to effect such camming action, wherein the shiftable means comprises: a cam member engaging the sleeve and being actuable to draw the sleeve and, as a consequence, its flange into cammed engagement with the collet, a guide block surrounding the cam member, an annular series of cam pins supported in the guide block for radial movement into engagement with the cam member for actuating the latter, a ring member slidable on the guide block over projecting heads of the cam pins so as to effect the radial movement of the cam pins in the guide block, and a pivoted lever having an opening surrounding the ring member and having a pair of opposed roller elements engaged in a peripheral channel of the ring member, whereby pivoting of the lever causes the roller elements to ride the channel and, as a consequence, effect a slide movement of the ring member over the heads of the pins.

14. In the combination as in claim 13, wherein the roller elements are partly contained in close recesses of the lever and are partly engaged in the channel of the ring member.

15. In the combination as in claim 13, wherein a lubricant fitting is associated with a bore through the rollers, whereby the rollers and associated channel are lubricated to facilitate shift operations.

References Cited in the file of this patent

UNITED STATES PATENTS

| | | |
|---|---|---|
| 2,396,006 | Hall | Mar. 5, 1946 |
| 2,406,444 | Stoner | Aug. 27, 1946 |
| 2,501,648 | Ogden | Mar. 21, 1950 |
| 2,536,519 | Stoner et al. | Jan. 2, 1951 |